United States Patent [19]

Lindroos

[11] 4,372,761

[45] Feb. 8, 1983

[54] SCRUBBER FOR CLEANING DUST-LOADED GAS AND STEAM

[75] Inventor: Ingvald R. Lindroos, Frövi, Sweden

[73] Assignee: Rilett Energitjanst AB, Sweden

[21] Appl. No.: 242,233

[22] Filed: Mar. 10, 1981

[30] Foreign Application Priority Data

Mar. 14, 1980 [SE] Sweden .............................. 8002023

[51] Int. Cl.³ ............................................. B01D 47/06
[52] U.S. Cl. ........................................ 55/260; 55/296;
55/435; 422/176; 422/178; 422/210
[58] Field of Search ................ 55/220, 242, 295, 296,
55/428, 430, 466, 121, 260, 435; 422/176, 178,
210; 15/104.05, 104.1 R, 104.16, 236 C, 242

[56] References Cited

U.S. PATENT DOCUMENTS

| 887,004 | 5/1908 | Miles ...................................... 55/220 |
| 2,321,275 | 6/1943 | Blackburn ........................ 15/104.05 |
| 3,495,383 | 2/1970 | Nelson .................................. 55/220 |
| 3,518,817 | 7/1970 | Deil'Agnese et al. ................. 55/260 |
| 3,550,177 | 12/1970 | Darr et al. ........................... 422/210 |
| 3,807,962 | 4/1974 | Gostavsson ........................... 55/296 |

FOREIGN PATENT DOCUMENTS 308765 9/1971 U.S.S.R. ................................ 55/435

*Primary Examiner*—David L. Lacey
*Attorney, Agent, or Firm*—Burns, Doane, Swecker & Mathis

[57] ABSTRACT

The invention relates to a scrubber for cleaning dust-loaded gas and/or steam. The scrubber is provided with an inlet for the gas and/or steam and an outlet. One or more nozzles are arranged within the scrubber for atomizing washing liquid over the cross-section of the scrubber. The scrubber further includes a scraping device located rotatably in the inlet, which scraping device consists of a plurality of rods in parallel with the axial direction of the inlet.

8 Claims, 2 Drawing Figures

U.S. Patent
Feb. 8, 1983
4,372,761
FIG.1
FIG.2
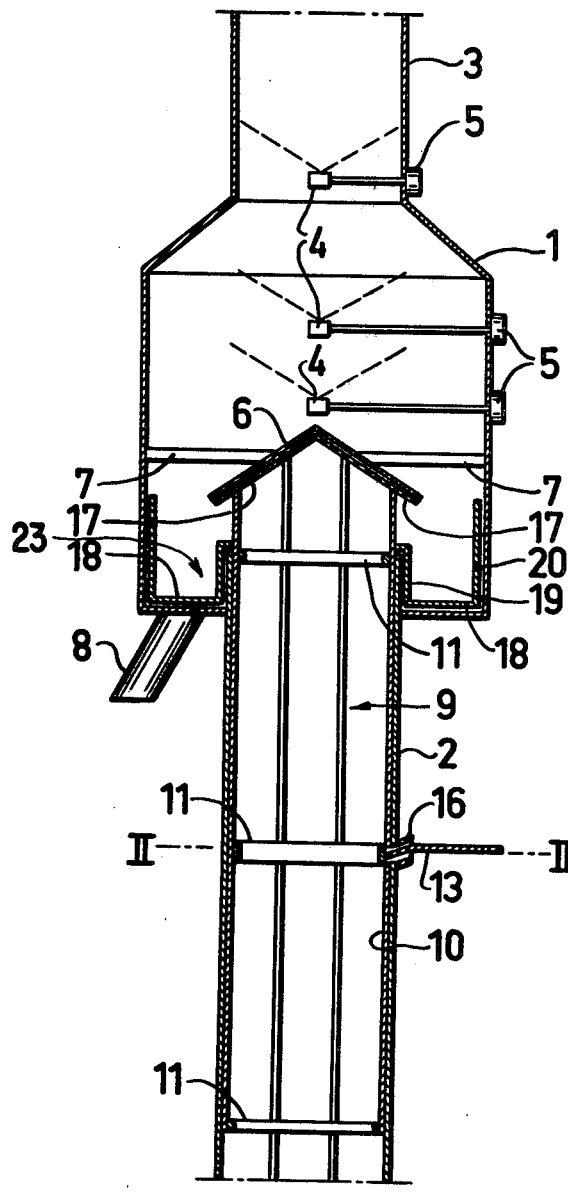
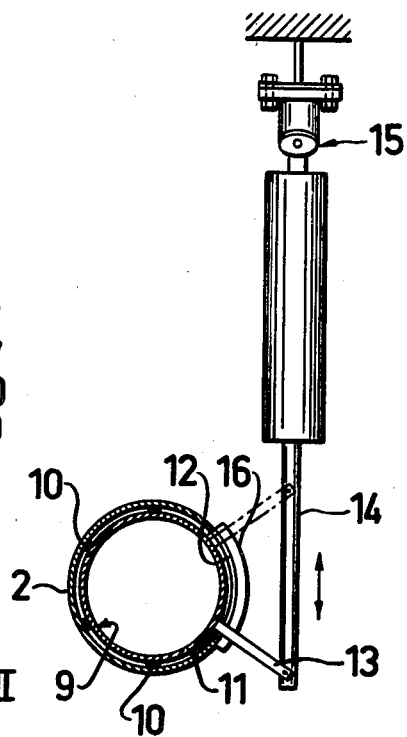

SCRUBBER FOR CLEANING DUST-LOADED GAS AND STEAM

BACKGROUND OF THE INVENTION

This invention relates to a scrubber for the cleaning of dust-loaded gas or steam. The scrubber may be of the type, in which the gas or steam is introduced downwardly into the scrubber through an inlet and washed with a washing liquid, for example water, in that the liquid is finely distributed over the flow path of the gas by means of suitably positioned nozzles. The washing liquid, which is collected on the scrubber bottom and includes dust washed out from the gas and possibly also other substances, is removed e.g. via a drain pipe.

The aforesaid scrubber type is utilized especially, among others, in the cellulose industry, for example at paper making, where it is applied in various vapour escapes and chimneys, for example in recovery boilers, mixing departments and clarifiers. This scrubber, however, is not sufficient for use under very difficult conditions. In a sulphate mixing tank for thick liquor for charging a recovery boiler, for example, raw sulphate is added together with sulphate ashes recovered from the recovery boiler and electrostatic precipitators, which are mixed together by means of stirrers. The thick liquor in the mixing tank has a temperature of about 108° C., which gives rise to violent gas and steam formation in the tank, which are discharged via a vapour escape to the atmosphere. The emissions from the tank must be treated efficiently, in order to recover the heat in the waste gases and also to separate from the gases dust and substances to be recycled in the process. The violent gas and steam development which includes a large quantity of dust implies, that the known scrubber, in spite of intense pouring of washing liquid on its inside, is covered with emission products, particularly in the lower part of the scrubber. Also the inlet of the vapour escape in the scrubber is covered with solid substances included in the gas and steam. This layer of solids increases rapidly in thickness when the scrubber is in operation.

The present invention eliminates the shortcomings of known heat recovery and condensate systems and renders it possible, by the scrubber according to the invention to efficiently clean and recover heat from a gas and/or steam mixture heavily contaminated by dust while the scrubber is continuously in operation.

BRIEF DESCRIPTION OF THE DRAWINGS

The invention is described in greater detail in the following, with reference to the drawing, in which FIG. 1 is a cross-sectional view of a scrubber seen from the side, and FIG. 2 is a view taken along the line II—II in FIG. 1, including an actuating device.

DETAILED DESCRIPTION OF THE PREFERRED EMBODIMENT

In the drawing, a scrubber, in the embodiment shown is formed of a cylindric casing with a truncated cone upper portion with a vapour escape duct 2 defining an inlet duct arranged to open concentrically into the scrubber 1. The scrubber 1 is upwardly provided with an outlet 3. In the scrubber shown three nozzles 4 are provided, which through connections 5 are supplied with a washing liquid under pressure, for example water. When, for example, the scrubber is applied in the vapour escape of the sulphate mixing tank, and in order to prevent detrimental influence on the dry content of the thick liquor in the tank, which would deteriorate the combustion in the recovery boiler, the scrubber 1 is provided with a shield 6 attached over the opening of the vapour escape, which shield thus prevents washing liquid from arriving at the vapour escape and penetrating down into the tank. The shield is attached to the scrubber by means of brace members 7. The washing liquid, which is sprayed in a dish-shaped pattern (indicated by dashed lines) over the entire flow cross-section of the gas and steam flow, is poured on the inside of the scrubber and is collected, together with condensate and dust washed out, on the scrubber bottom, from where it is drained intermittently via a drain pipe 8.

In the inlet or vapour escape duct 2 to the scrubber, a a scraping device 9 is provided, which extends downward into the vapour escape duct opening.

The scraping device 9 comprises a number (in the embodiment shown six) of rods 10, which extend axially in the inlet and are rigidly interconnected by three rings 11, as shown. An actuating arm 13 extends through a slit 12 in the vapour escape duct 2 and is attached substantially axially centrally on the central one of the rings 11 which has a relatively large axial extension. By means of an actuating member, for example a pneumatically operated piston with piston rod 14, it is thus possible to turn the scraper 9 reciprocatingly in the inlet duct. The cylinder for the actuating member is hingedly attached (indicated by 15) for permitting movement of the arm 13. The distance or division between the rods 10 is smaller than their peripheral movement during one stroke of the piston rod 14, whereby each rod upon rotation of the scraper means moves past the previous position of an adjacent rod. In this way, the inlet duct can be cleaned efficiently.

Both above and beneath the slit 12 in the vapour escape duct a flange 16 is located. The two flanges are inclined upward as indicated in FIG. 1. The actuating arm 13 is provided with a correspondingly inclined or angular portion, in order to be able to run easily in the slit and between the flanges. Due to the fact, that these inclined flanges define the slit, steam possibly leaking out through the slit and condensing, or condensate, are led back through the slit and again into the vapour escape duct 2.

As appears from FIG. 1, the rods 10 are extended upward to the lower surface of the shield 6. Rods 17 extending from an imagined extension of the rotation axis of the scraping means are arranged radially like spokes of a wheel and upon rotation of the scraping means generate a surface corresponding to the lower surface of the shield 6, in the embodiment shown a conical surface. Each of the rods 17 is connected near a radially outward end to a respective one of the rods 10. In this way it is possible to maintain the lower surface of the shield free from being covered.

From the rods 10 of the scraping means extend radially outward rods 23, which in principle are curved to U-shape and formed of three rod portions. The rod portions 18 or bottom of said rods 23 extend along the scrubber bottom. The rod portions 19 and 20 of said rods 23 extend along the outside of the inlet duct and along a part of the inside of the scrubber casing, respectively. The rod portions 18 in the form of a web rest against the plane bottom of the scrubber and together with it form an axial bearing for the scraping means, which thus is suspended on said rod portions 18–20. The mutual distance between the outer rod portions of the rods 23, in agreement with the distance between the rods 10, shall be smaller than the peripheral movement of the rod portions during one stroke. In this way, it is possible to efficiently scrape clean the lower portion of the scrubber.

The scraping means preferably is operated intermittently, controlled for example by a timing watch. It is hereby possible to keep the scrubber clean to an extent, which heretofore has not been possible to achieve. The material removed by the scraper in the scrubber flows along with the washing liquid when it is being drained through the drain pipe 8. The material removed by the scraper in the vapour escape duct 2 drops down through the pipe, for example to the mixing tank, unless it is taken along by the gas-steam mixture.

The rods 17 and the rod portions 18–20, for reasons of elucidation, have been illustrated with exaggerated distance from the respective surface to be cleaned, but it is understood that these distances in reality are very small, if there is no direct contact as is the case, of course, with the rod portions 18 in the scrubber shown.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit and scope of the present invention. Accordingly, it is expressly intended that all such variations and changes which fall within the spirit and scope of the present invention as defined in the claims be embraced thereby.

What I claim is:

1. A scrubber for cleaning dust-loaded gas and/or steam, comprising an inlet duct for the gas and/or steam and an outlet, at least one nozzle arranged in the scrubber for atomizing a washing liquid to be distributed over the cross-section of the scrubber, a scraping device located in the inlet duct on the inside thereof, said scraping device being mounted for reciprocating rotary movement relative to the inlet duct, said scraping device including a plurality of interconnected rods in parallel with an axial direction of the inlet duct, each of said plurality of rods being closely adjacent an inside peripheral surface of the inlet duct, said rods being only interconnected by at least one annular ring such that no portion of the scraping device in the inlet duct extends inwardly of the at least one annular ring toward the axis of the duct.

2. The scrubber as defined in claim 1, further comprising a shield located within the scrubber above an opening of the inlet duct, at least a portion of the plurality of rods is extended into the scrubber beyond the opening of the inlet duct into the scrubber and said extended portion of each rod being provided with an additional rod which extends radially and is interconnected to the other additional rods at the rotational axis of the scraping device, said additional rods being positioned closely adjacent a lower surface of the the shield such that upon rotation of the scraping device said additional rods move along the lower surface of the shield.

3. The scrubber as defined in claim 1 or 2, wherein the scrubber has at least partially a cylindrical shape and wherein the inlet duct opens concentrically into the scrubber, further comprising second rods attached to at least a portion of the plurality of rods and directed radially outward, said second rods upon rotation of the scraping device being arranged to move along closely adjacent to the scrubber bottom.

4. The scrubber as defined in claim 3, wherein the scraping device rests with the radially outward directed second rods against the bottom, the second rods form carrying axial bearings for the scraping device.

5. The scrubber as defined in claim 3, wherein the radially outward directed second rods each include an extension directed upward closely adjacent the peripheral wall of the scrubber.

6. The scrubber as defined in claim 1, wherein said at least one ring has an axial extension, an actuating arm extends radially outward through a slit in the inlet duct, said actuating arm being attached substantially centrally on the axial extension of the at least one ring, and the actuating arm being at least partially inclined upward.

7. The scrubber as defined in claim 6, wherein at least the lower edge of the slit is provided with an outward directed upward inclined flange.

8. The scrubber as defined in claim 1, wherein the distance between adjacent ones of the plurality of rods is smaller than the peripheral movement of the scraping device during one reciprocating stroke thereof.

* * * * *